US007712546B2

(12) United States Patent
Tokunaga

(10) Patent No.: US 7,712,546 B2
(45) Date of Patent: May 11, 2010

(54) POWER TOOL HAVING TORQUE LIMITER

(75) Inventor: Manabu Tokunaga, Anjo (JP)

(73) Assignee: Makita Corporation, Anjo-shi (JP)

( * ) Notice: Subject to any disclaimer, the term of this patent is extended or adjusted under 35 U.S.C. 154(b) by 566 days.

(21) Appl. No.: 11/712,953

(22) Filed: Mar. 2, 2007

(65) Prior Publication Data

US 2007/0221022 A1 Sep. 27, 2007

(30) Foreign Application Priority Data

Mar. 7, 2006 (JP) ............................ 2006-061787

(51) Int. Cl.
*B23B 33/00* (2006.01)

(52) U.S. Cl. ....................... 173/156; 173/178; 173/181; 173/146; 173/5

(58) Field of Classification Search ................. 173/178, 173/5, 181, 146, 156; 82/165
See application file for complete search history.

(56) References Cited

U.S. PATENT DOCUMENTS

| | | | | |
|---|---|---|---|---|
| 3,703,933 | A * | 11/1972 | Schoeps | 173/178 |
| 3,955,662 | A * | 5/1976 | Thackston | 192/150 |
| 4,071,092 | A * | 1/1978 | Wallace | 173/178 |
| 4,265,320 | A * | 5/1981 | Tanaka et al. | 173/178 |
| 4,823,885 | A * | 4/1989 | Okumura | 173/178 |
| 6,079,303 | A * | 6/2000 | Lyachovitsky | 82/165 |
| 6,505,690 | B2 * | 1/2003 | Tokunaga | 173/93.5 |
| 6,708,778 | B2 * | 3/2004 | Tokunaga | 173/93.5 |
| 6,968,908 | B2 * | 11/2005 | Tokunaga et al. | 173/181 |

(Continued)

FOREIGN PATENT DOCUMENTS

| | | |
|---|---|---|
| EP | 0 761 350 | 8/1996 |

(Continued)

OTHER PUBLICATIONS

Oct. 21, 2009 European Search Report issued in European Patent Application No. 07004451.6-2316/1834735.

*Primary Examiner*—Brian D Nash
(74) *Attorney, Agent, or Firm*—Oliff & Berridge, PLC

(57) ABSTRACT

It is an object of the invention to provide an effective technique for avoiding the influence of reaction during tightening operation in the rotary fastening tool. Representative rotary fastening tool includes a tool body, a motor housed within the tool body, a driving-side rotating member that is rotationally driven by the motor, a driven-side rotating member that is disposed coaxially with the driving-side rotating member, a tip-end side rotating member that is disposed coaxially with the driven-side rotating member and rotationally driven via the driven-side rotating member, the tip-end side rotating member driving a tool bit to perform a tightening operation and a rotation control mechanism that allows the tip-end side rotating member to rotate in the tightening direction during the tightening operation of the tool bit, wherein, when the tip-end side rotating member is fixed to a workpiece with the tool bit during the tightening operation and when torque transmission from the driving-side rotating member to the driven-side rotating member is interrupted, the rotation control mechanism locks the tip-end side rotating member and the tool body together against rotation with respect to each other to prevent the tool body from rotating in the tightening direction.

14 Claims, 7 Drawing Sheets

U.S. PATENT DOCUMENTS

| | | | | |
|---|---|---|---|---|
| 2001/0010268 | A1* | 8/2001 | Tokunaga et al. | 173/205 |
| 2001/0027871 | A1* | 10/2001 | Tokunaga | 173/93 |
| 2002/0112868 | A1* | 8/2002 | Tokunaga | 173/93.5 |
| 2004/0182588 | A1* | 9/2004 | Tokunaga et al. | 173/2 |
| 2004/0231952 | A1 | 11/2004 | Nakamura et al. | |
| 2007/0180959 | A1* | 8/2007 | Tokunaga et al. | 81/474 |

FOREIGN PATENT DOCUMENTS

| | | |
|---|---|---|
| EP | 0 909 614 | 10/1997 |
| JP | U-50-033759 | 10/1975 |

* cited by examiner

POWER TOOL HAVING TORQUE LIMITER

BACKGROUND OF THE INVENTION

1. Field of the Invention

The present invention relates to a rotary fastening tool and typically to a rotary fastening tool with a torque limiter that interrupts torque transmission from the input side to the output side when torque acting on a tool bit reaches a set value.

2. Description of the Related Art

Japanese utility model publication No. 50-33759 discloses an electric screwdriver having a torque limiter that transits torque from the input side to the output side. In the known art, a pair of clutches for torque limiter is provided between the input side and the output side. The clutches have clutch teeth formed in the respective clutch surfaces facing with each other and engage with each other in the direction of rotation. One of the clutches is biased toward the other by a spring member. During screw-tightening operation, when the screw head is seated on the workpiece, torque acting upon the output side clutch increases. When the torque reaches a set value, power is interrupted.

In screw-tightening operation, a reaction force acts upon a housing that forms a driver body, in a direction opposite to the screw-tightening direction with respect to rotation on the axis of the tool bit. Therefore, the user holds the driver body (the handgrip) while applying a force in the screw-tightening direction in such a manner as to prevent the driver body from rotating by the reaction force. However, in this state, when the torque limiter is actuated and the reaction force acting upon the driver body is instantaneously eliminated, as its reaction, the user's hand holding the driver body is caused to move in the screw-tightening direction. Thus, in the known electric screwdriver having a torque limiter, the driver body unexpectedly rotates just after actuation of the torque limiter. Therefore, further improvement in ease of use is desired.

SUMMARY OF THE INVENTION

Accordingly, it is an object of the invention to provide an effective technique for avoiding the influence of reaction during tightening operation in the rotary fastening tool.

Above-described problem can be solved by the features of claimed invention.

According to the invention, a representative rotary fastening tool is provided to have a tool body, a motor a driving-side rotating member, a driven-side rotating member, a tip-end side rotating member and a rotation control mechanism. The motor is housed within the tool body. The driving-side rotating member is rotationally driven by the motor. The driven-side rotating member is disposed coaxially with the driving-side rotating member. The tip-end side rotating member is disposed coaxially with the driven-side rotating member and rotationally driven via the driven-side rotating member. The tip-end side rotating member drives a tool bit to perform a tightening operation.

The rotation control mechanism allows the tip-end side rotating member to rotate in the tightening direction during the tightening operation of the tool bit. The rotation control mechanism may preferably be disposed between the tool body and the tip-end side rotating member. When the tip-end side rotating member is fixed to a workpiece with the tool bit during the tightening operation and when torque transmission from the driving-side rotating member to the driven-side rotating member is interrupted, the rotation control mechanism locks the tip-end side rotating member and the tool body together against rotation with respect to each other. As a result, the tool body is prevented from being rotated in the tightening direction, typically at the end of a tightening operation.

During the operation of tightening such as screws or bolts, a reaction force acts upon a tool body in a direction opposite to the tightening direction. Therefore, the user of the rotary fastening tool tends to hold the tool body in such a manner as to prevent the tool body from rotating by the reaction force. However, in this state, reaction force acting upon the tool body is instantaneously eliminated for example as a result of a torque limiter, the user's hands holding the tool body is caused to move in the tightening direction as a result of a reaction. According to the invention, the rotation control mechanism prevents the tool body from rotating in the tightening direction by locking the tool body to the tip-end side rotating member which is trapped and fixed to the workpiece with the tool bit at an end of the tightening operation. Thus, the force applied by the user in the tightening direction can be supported by the tip-end side rotating member fixed on the workpiece side. Therefore, the user's hand holding the tool body can be prevented from being caused to move in the tightening direction for example just after actuation of the torque limiter.

During the operation of loosening screws or bolts, by rotation of the driven-side rotating member in the loosening direction, the rotation control mechanism is disabled from performing the function of locking the tip-end side rotating member and the tool body together against rotation with respect to each other. Specifically, solely by driving the motor in the reverse direction, the rotation control mechanism can be disabled from performing the function of locking the tip-end side rotating member and the tool body. Therefore, there is no need to perform an additional operation for disabling the locking function of the rotation control mechanism, so that ease of operation in switching between tightening operation mode and loosening operation mode can be enhanced.

The representative rotary fastening tool may preferably include a torque limiter. The torque limiter may transmit torque of the driving-side rotating member to the driven-side rotating member when the torque acting upon the driven-side rotating member is lower than a predetermined set value. On the other hand, the torque limiter may interrupt the torque transmission when the torque acting upon the driven-side rotating member exceeds the set value.

Further, according to the representative rotary fastening tool, the motor may preferably be selectively driven both in a normal direction to perform a tightening operation and a reverse direction of rotation to perform a loosening operation by mode-selecting operation. During the loosening operation of the tool bit, the rotation control mechanism may be disabled from locking the tip-end side rotating member and the tool body by utilizing a rotation of the driven-side rotating member in the loosening direction. As a result, the tip-end side rotating member is allowed to rotate in the loosening direction to perform a loosening operation of the tool bit.

As another aspect of the invention, the rotation control mechanism may include a rotation control member and a retainer. The rotation control member may be disposed between the tool body and the tip-end side rotating member. When the tip-end side rotating member is rotated in the tightening direction, the rotation control member allows said rotation. On the other hand, when the tip-end side rotating member is rotated in the loosening direction, the rotation control member engages with both the tool body and the tip-end side rotating member and is moved between an actuated position and a released position. In the actuated position, the tip-end side rotating member is locked to the tool body. In the released position, the engagement with the tool body and the tip-end side rotating member is released and the tip-end side rotating member can be freely rotate with respect to the tool body.

The retainer may be disposed between the tool body and the tip-end side rotating member such that the retainer is allowed to rotate with respect to the tool body and the tip-end side rotating member. The retainer moves the rotation control member between the actuated position and the released position and retains the rotation control member in that position. Typically, the rotation control member may wedge in the tool body and the tip-end side rotating member to lock both members.

When the motor is driven in the normal direction and the driven-side rotating member is rotated in the tightening direction, the driven-side rotating member may rotate the retainer in the tightening direction before rotationally driving the tip-end side rotating member to cause the retainer to move the rotation control member to the actuated position. As a result, when the tip-end side rotating member is rotated with respect to the tool body in the loosening direction, the retainer allows the rotation control member to lock the tip-end side rotating member and the tool body together. On the other hand, when the motor is driven in the reverse direction and the driven-side rotating member is rotated in the loosening direction, the driver-side rotating member rotates the retainer in the loosening direction before rotationally driving the tip-end side rotating member, which causes the retainer to move the rotation control member to the released position. As a result, the retainer disables the rotation control member from performing the function of locking the tip-end side rotating member and the tool body together and allows the loosening operation of the tool bit.

According to the preferred aspect of the invention, when the driven-side rotating member rotates in the tightening direction or the loosening direction, the retainer is rotated in the tightening direction or the loosening direction before the tip-end side rotating member is rotated. Therefore, during tightening operation, the rotation control member is moved to the actuated position by the retainer and can ensure the function of locking the tool body to the tip-end side rotating member when the torque limiter is actuated. During loosening operation, the rotation control member is moved to the released position by the retainer and can be disabled from performing the function of locking the tool body to the tip-end side rotating member. Thus, the operation of tightening or loosening screws or bolts can be smoothly performed.

As another aspect of the invention, the tip-end side rotating member may include a plane region in a predetermined extent in the circumferential direction. The rotation control member may include a member that has a circular section. During the tightening operation of the tool bit, when torque transmission is interrupted, the rotation control member moves toward one end of the plane region in the circumferential direction and engages with both the plane region and the inner wall surface of the tool body, thereby locking the tip-end side rotating member and the tool body together. Thus, rotation of the tool body in the tightening direction with respect to the tip-end side rotating member can be prevented. Further, the retainer may include an elastic element that biases the circular member toward the one end of the plane region in the circumferential direction.

When the torque transmission is interrupted during the tightening operation, the tip-end side rotating member and the tool body can be locked by the wedging effect of the circular member that engages in (a narrow-angle portion) between the plane region of the tip-end side rotating member and the inner wall surface of the tool body. Further, the circular member is biased in the direction of such engagement by the biasing member so that the circular member can instantaneously and reliably achieve such engagement. The member having a circular section may typically include a rod-like element having a circular section or a spherical element. When a rod-like element is used as the circular member, surface pressure exerted between the plane region of the tip-end side rotating member and the inner wall surface of the tool body during engagement can be reduced. As a result, the durability can be increased. When a spherical element is used as the circular member, ease of assembling can be enhance.

The torque limiter may include a plurality of first torque receiving parts and a plurality of first torque transmitting parts in the circumferential direction. The first torque receiving parts may be provided on the driven-side rotating member. The first torque transmitting parts may rotate together with the driving-side rotating member and transmit torque of the driving-side rotating member to the driven-side rotating member while being held in contact with the first torque receiving parts.

Further, the rotary fastening tool may include a second torque receiving part that protrudes radially outward from the tip-end side rotating member, and a second torque transmitting part having a predetermined phase difference in the circumferential direction with respect to the second torque receiving part. The second torque transmitting part may rotate together with the driven-side rotating member and transmits torque of the driven-side rotating member to the tip-end side rotating member while being held in contact with the second torque receiving part. The rotary fastening tool may further include a third torque receiving part that protrudes from the retainer in the direction of a rotation axis of the driven-side rotating member, and a third torque transmitting part having a predetermined phase difference in the circumferential direction with respect to the third torque receiving part. The third torque transmitting part rotates together with the driven-side rotating member and transmits torque of the driven-side rotating member to the retainer while being held in contact with the third torque receiving part. The terms of phase according to the invention may represent a phase of engagement in the direction of rotation or a phase with respect to the angle of engagement or a phase difference of the engagement angle in the direction of rotation between the torque transmitting part and the torque receiving part. In other words, it may represent a play region in which torque transmission is not effected in the direction of rotation.

Further, a phase angle between the third torque receiving part and the third torque transmitting part in the circumferential direction may be larger than a phase angle between the first torque transmitting parts in the circumferential direction. With such configuration, when the torque transmission is interrupted during the tightening operation of the tool bit, the retainer is prevented from being rotated by rotation of the driven-side rotating member in the loosening direction. Thus, the rotation control member is held in the actuated position.

Further, a phase angle between the third torque receiving part and the third torque transmitting part in the circumferential direction may be smaller than a phase angle between the second torque receiving part and the second torque transmitting part in the circumferential direction. With such configuration, during the tightening operation of the tool bit, the driven-side rotating member rotates the retainer in the tightening direction before rotationally driving the tip-end side rotating member. Thus, the rotation control member is moved to the actuated position. During the loosening operation of the tool bit, the driven-side rotating member rotates the retainer in the loosening direction before rotationally driving the tip-end side rotating member. Thus, the rotation control member is moved to the released position.

As described above, the driven-side rotating member and the tip-end side rotating member are connected to each other via a play region in which torque transmission is not effected due to a phase difference provided between the second torque receiving part and the second torque transmitting part in the circumferential direction (the direction of rotation). Further, the driven-side rotating member and the retainer are connected to each other via a play region in which torque mission is not effected due to a phase difference provided between the third torque receiving part and the third torque transmitting part in the circumferential direction.

During the tightening operation, when the torque transmission is interrupted or when the first torque receiving part of the driven-side rotating member is disengaged from the first torque transmitting part of the driving-side rotating member, a force acts upon the driven-side rotating member in a direction that causes the driven-side rotating member to rotate in the loosening direction. According to the invention, with the construction in which the play region between the driven-side rotating member and the retainer is larger than the intervals (the play region) between the plurality of the first torque transmitting parts, even if the driven-side routing member is caused to rotate in the loosening direction when the torque limiter interrupts the torque transmission, this rotation of the driven-side rotating member can be limited within the play region between the driven-side rotating member and the retainer. Therefore, rotation of the driven-side rotating member does not affect the retainer. Specifically, during the tightening operation, the rotation control member can be held in the actuated position, so that the locking function of the rotation control member can be maintained.

Further, according to the invention, the play region between the driven-side rotating member and the retainer is smaller than the play region between the driven-side rotating member and the tip-end side rotating member. With this configuration, when the driven-side rotating member starts to rotate in the tightening direction or the loosening direction, the retainer can be rotated in the tightening direction or the loosening direction before the tip-end side rotating member is rotated. Thus, it can be ensured that rotation of the retainer positively precedes rotation of the tip-end side rotating member at the time of mode change between tightening operation and loosening operation.

The retainer may preferably be held by friction by the elastic member in such a manner as to be prevented from rotating with respect to the tip-end side rotating member unless rotated by the driven-side rotating member rotating in the loosening direction. The retainer can be prevented from freely moving so that its proper functioning can be ensured. The elastic member may typically include an O-ring or a torsion spring.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved rotary fastening tools and method for using such rotary fastening tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to pace the invention in the broadest sense, and are instead taught merely to particularly describe some representative examples of the invention, which detailed description will now be given with reference to the accompanying drawings.

Figure 1:
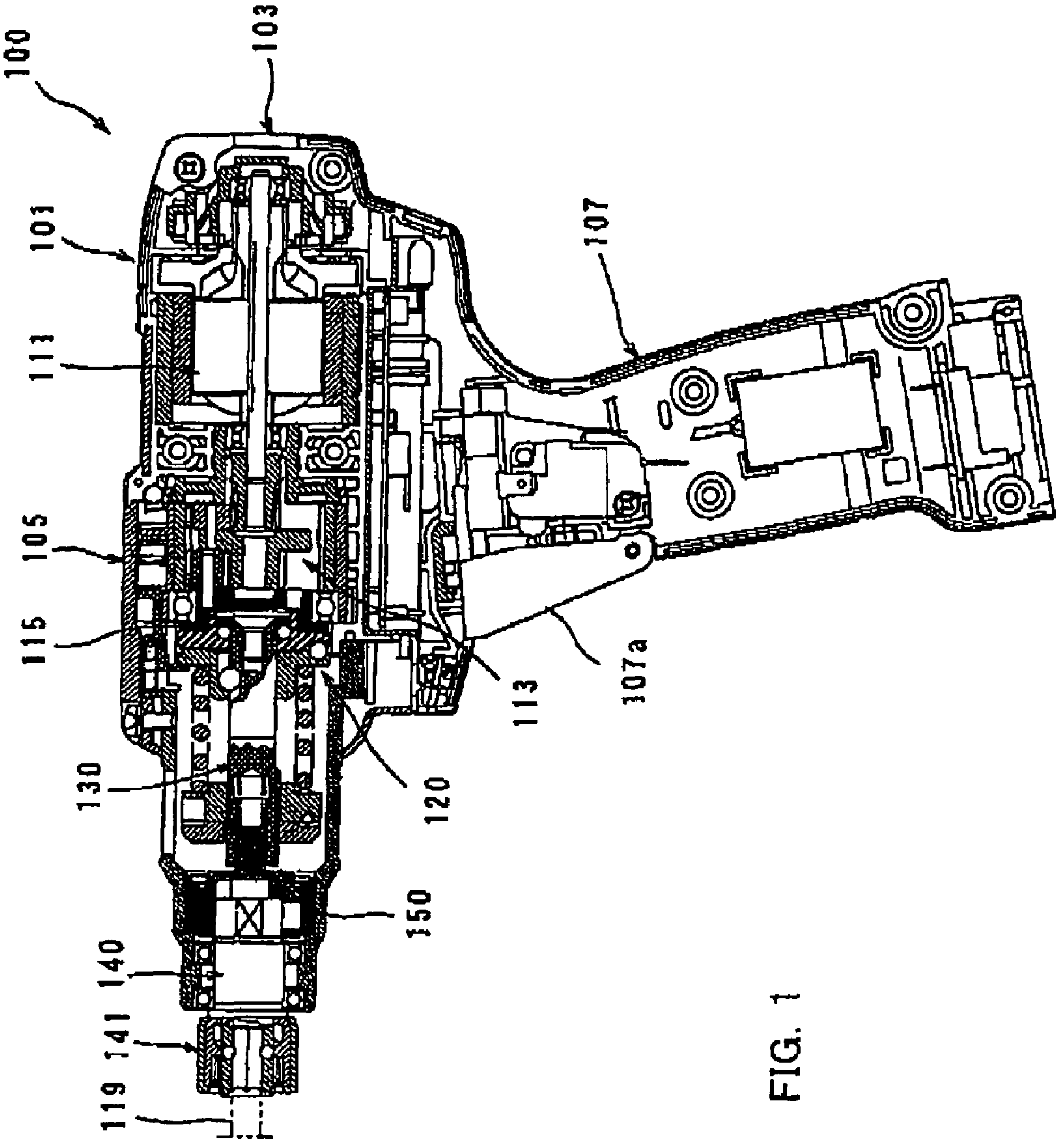
FIG. 1 is a sectional side view schematically showing an entire electric screwdriver according to an embodiment of the invention.

A representative embodiment of the invention will now be described with reference to the drawing. FIG. 1 shows an entire electric screwdriver 100 as a representative embodiment of the rotary fastening tool according to the present invention. The screwdriver 100 includes a body 101, a driver bit 119 detachably coupled to the tip end region (on the left side as viewed in FIG. 1) of the body 101 via a tool holder 141, and a handgrip (handle 107 connected to the body 101. In the present embodiment, for the sake of convenience of explanation, the side of the driver bit 119 is taken as the front side and the opposite side as the rear side.

The body 101 includes a motor housing 103 that houses a driving motor 111, and a gear housing 105 that houses a speed reducing mechanism 113, a torque limiter 120, a first spindle

130, a second spindle 140 and a one-way clutch 150. The driving motor 111 is driven when a trigger 107*a* on the handgrip 107 is depressed. The direction of rotation of the motor shaft of the driving motor 111 can be selected between normal rotation (clockwise forward or "screw-tightening direction") and reverse rotation (counterclockwise forward or "screw-loosening direction") by operating a rotation selection switch (not shown).

The rotating output of the driving motor 111 is transmitted from a power transmitting mechanism in the form of the speed reducing mechanism 113 to the second spindle 140 as a rotating force via a rotation drive disc 115, the torque limiter 120 and the first spindle 130. The tool holder 141 is disposed in the tip end region of the second spindle 140 and rotates together with the second spindle 140. The driver bit 119 held by the tool holder 141 is rotationally driven together with the tool holder 141. The speed reducing mechanism 113 comprises a planetary gear mechanism, but the construction is a known art and therefore will not be described in detail. Further, the rotation drive disc 115 corresponds to a carrier that supports planetary gears of the planetary gear mechanism for free rotation, and forms an output shaft of the speed reducing mechanism 113. The rotation drive disc 115, the torque limiter 120, the first spindle 130, the second spindle 140 and the one-way clutch 150 are all disposed on the same axis.

Figure 2:
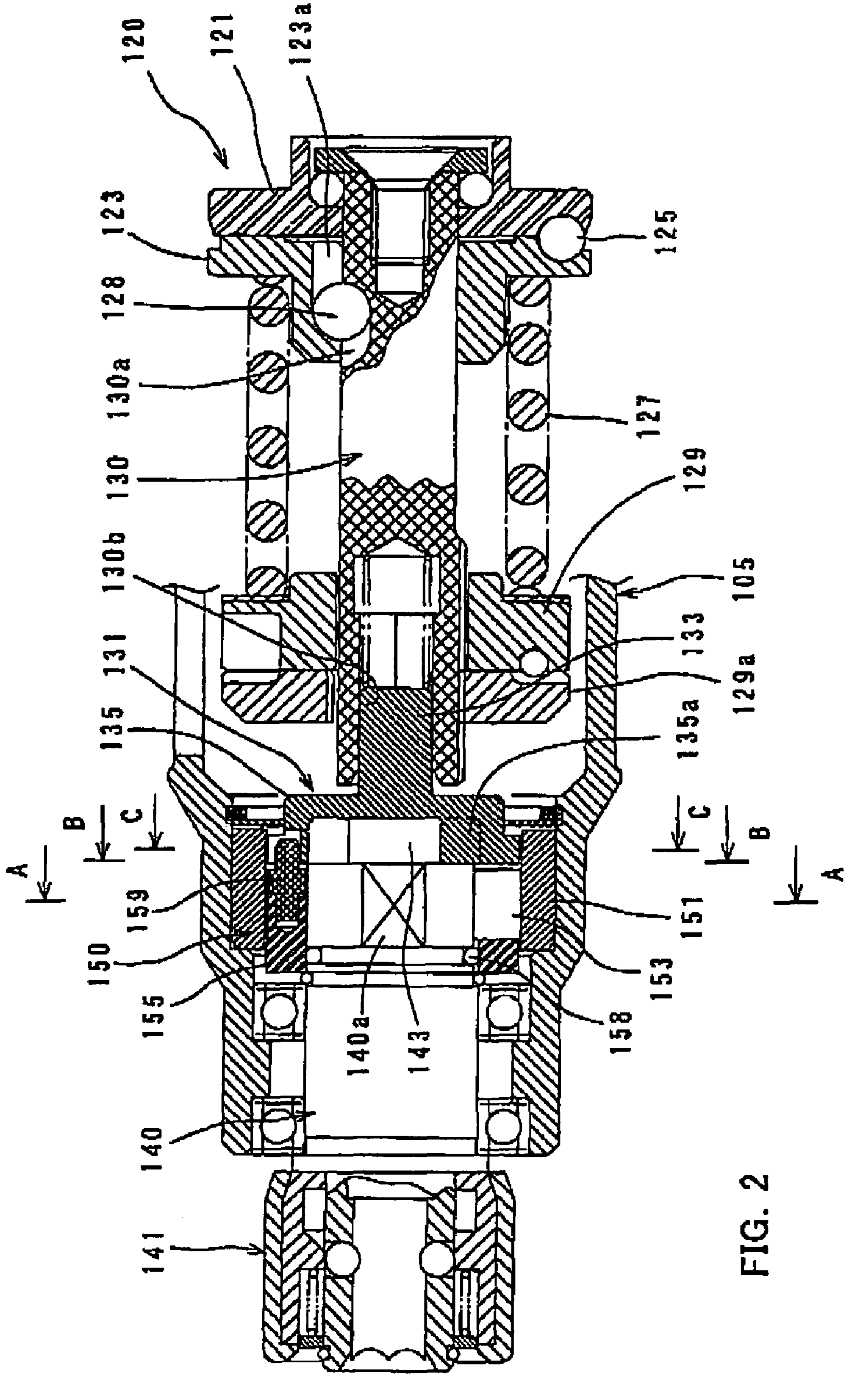
FIG. 2 is a sectional view of an essential part of the screwdriver, showing the construction of a torque limiter, a first spindle, a second spindle and a one-way clutch.

FIG. 2 shows the construction of the torque limiter 120, the first spindle 130, the second spindle 140 and the one-way clutch 150. The torque limiter 120 includes a driving-side clutch member 121 and a driven-side clutch member 123 which face each other, a plurality of first steel balls 125, and a compression coil spring 127. The first steel balls 125 are disposed between the clutch members 121 and 123 and serve to transmit torque of the driving-side clutch member 121 to the driven-side clutch member 123. The compression coil spring 127 serves as a biasing member for biasing the driven-side clutch member 123 toward the driving-side clutch member 121.

The driving-side clutch member 121 is mounted on the rotation drive disc 115 such that it is prevented from moving in the axial direction and from rotating on the axis (in the direction of rotation) with respect to the rotation drive disc 115. The driven-side clutch member 123 is fitted on the rear end portion (on the right side as viewed in FIG. 1) of the first spindle 130 in the axial direction. Elongated grooves 130*a* and 123*a* are formed in the outside surface of the first spindle 130 and the inside surface of the driven-side clutch member 123, respectively, and extend to a predetermined length in the axial direction. A second steel ball 128 is disposed in the elongated grooves 130*a*, 123*a*. Thus, the driven-side clutch member 123 is allowed to move in the axial direction while being prevented from rotating on the axis with respect to the first spindle 130.

Figure 3:
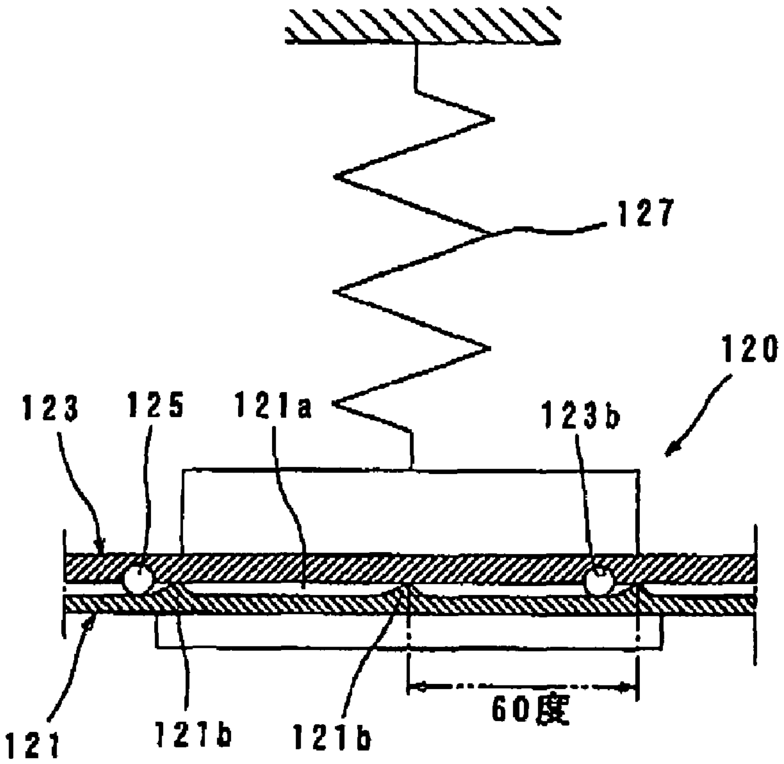
FIG. 3 is a schematic view of the torque limit in development.
Figure 4:
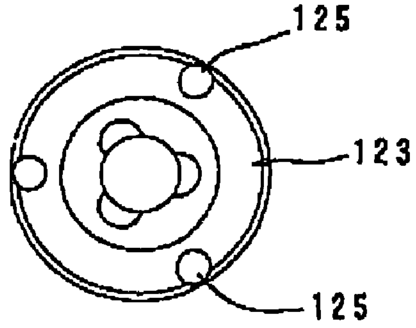
FIG. 4 is a side view of a driven-side clutch member of the torque limiter.
Figure 5:
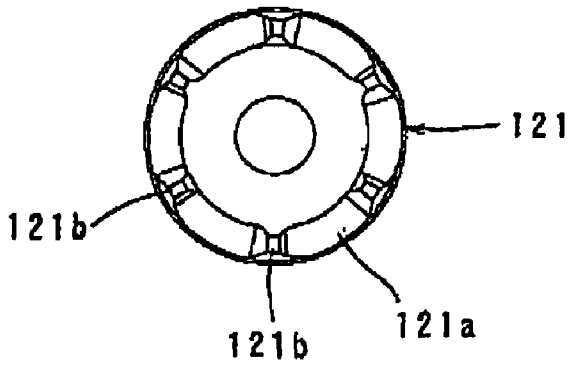
FIG. 5 is a side view of a driving-side clutch member of the torque limiter.

FIG. 3 shows the torque limiter 120 in development. As shown in FIG. 3, three spherical recesses 123*b* are formed in the rear side surface (the lower sure as viewed in FIG. 3) of the driven-side clutch member 123 and arranged equidistantly in the circumferential direction (at intervals of 120 degrees). The recesses 123*b* receive the first steel balls 125. An annular groove 121*a* is formed corresponding to the travel path of the first steel balls 125 in the front side surface of the driving-side clutch member 121. Six mountain-like cams 121*b* are formed in the annular groove 121*a* and arranged equidistantly in the circumferential direction (at intervals of 60 degrees). FIG. 4 shows the driven-side clutch member 123 in side view, and FIG. 5 shows the driving-side clutch member 121 in side view. Each of the first steel balls 125 held by the driven-side clutch member 123 is movably fitted in the annular groove 121*a* of the driving-side clutch member 121. The first steel ball 125 transmits the torque of the driving-side clutch member 121 to the driven-side clutch member 123 when the first steel ball 125 engages with the associated cam 121*b* from the circumferential direction. When the torque (rotational load) acting upon the first steel ball 125 exceeds a set value, the first steel ball 125 climbs over the cam 121*b* while moving the driven-side clutch member 123 away from the driving-side clutch member 121 against the spring force of the compression coil spring 127. As a result, the first steel ball 125 is disengaged from the cam 121*b*, so that the torque transmission from the driving-side clutch member 121 to the driven-side clutch member 123 is interrupted. The first steel ball 125 and the cam 121*b* are features that correspond to the "first torque receiving part" and the "first torque transmitting part", respectively, according to this invention.

As shown in FIG. 2, the compression coil spring 127 is disposed between the front surface of the driven-side clutch member 123 and a spring receiving member 129 threadably mounted on the first spindle 130. The compression coil spring 127 can change its position with respect to the first spindle 130 in the axial direction by rotating a nut 129*a* disposed on the front side of the spring receiving member 129. In this manner, the compression coil spring 127 can change its biasing force in order to adjust the torque setting for interruption of torque transmission.

Figure 8:
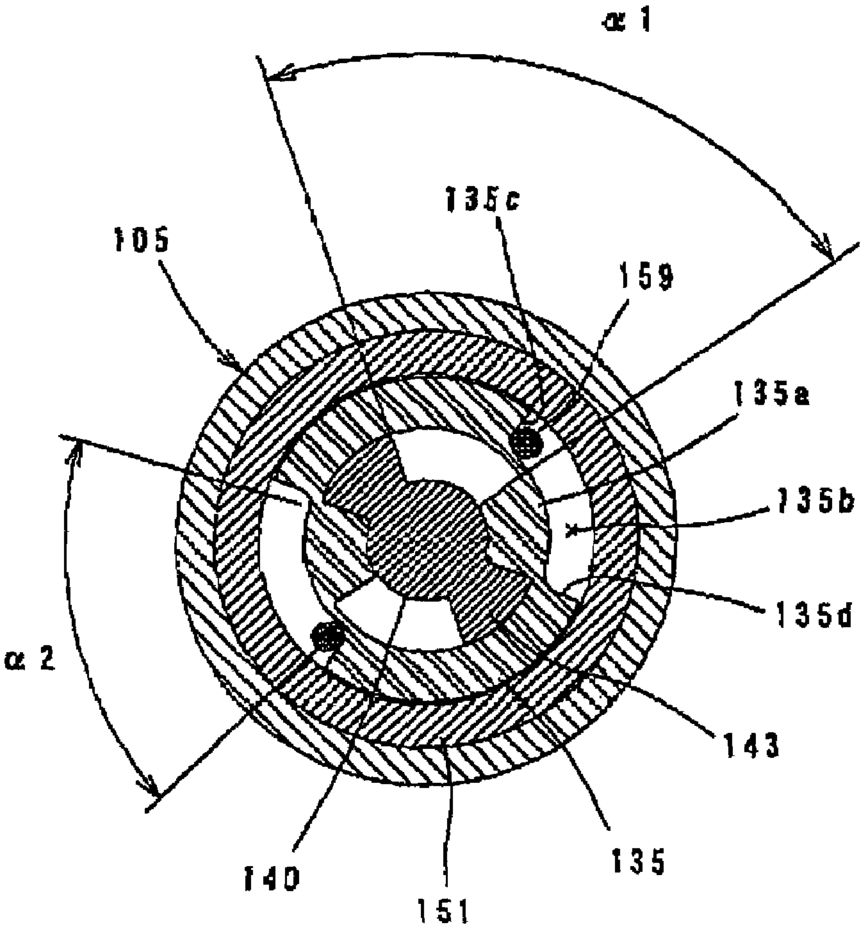
FIG. 8 is a sectional view taken along line C-C in FIG. 2.

A carrier 131 is disposed on the side of the front end portion of the first spindle 130 in the axial direction and rotates together with the first spindle 130. The first spindle 130 is connected to the second spindle 140 via the carrier 131. The carrier 131 includes a square shank 133 and a cylindrical portion 135. The square shank 133 is inserted into a square hole 130*b* of the first spindle 130, so that the carrier 131 rotates together with the first spindle 130. As shown in FIGS. 2 and 8, the cylindrical portion 135 of the carrier 131 is disposed in the outside region of the axial rear end portion of the second spindle 140. Two radially outwardly protruding driven-side claws 143 are formed in the rear end portion of the second spindle 140 with a phase difference of 180 degrees in the circumferential direction.

In a corresponding manner, two radially inwardly protruding driving-side claws 135*a* are formed in the inside surface of the cylindrical portion 135 of the carrier 131 with a phase difference of 180 degrees in the circumferential direction. When the carrier 131 is caused to rotate together with the fit spindle 130 in the normal direction (tightening direction) or the reverse direction (loosening direction), the driving-side claws 135*a* contact the driven-side claws 143 and transmit the torque of the first spindle 130 to the second spindle 140. The driven-side claws 143 and the driving-side claws 135*a* are features that correspond to the "second torque receiving part" and the "second torque transmitting part", respectively, according to this invention. One driven-side claws 143 in contact with one driving-side claw 135*a* is positioned at a predetermined phase angle $\alpha$1 in the circumferential direction from the other driving-side claw 135*a* in contact with the other driven-side claw 143. Thus, the carrier 131 and the second spindle 140 are connected to each other via a play region in which torque transmission is not effected in the circumferential direction (see FIG. 8).

Figure 6:
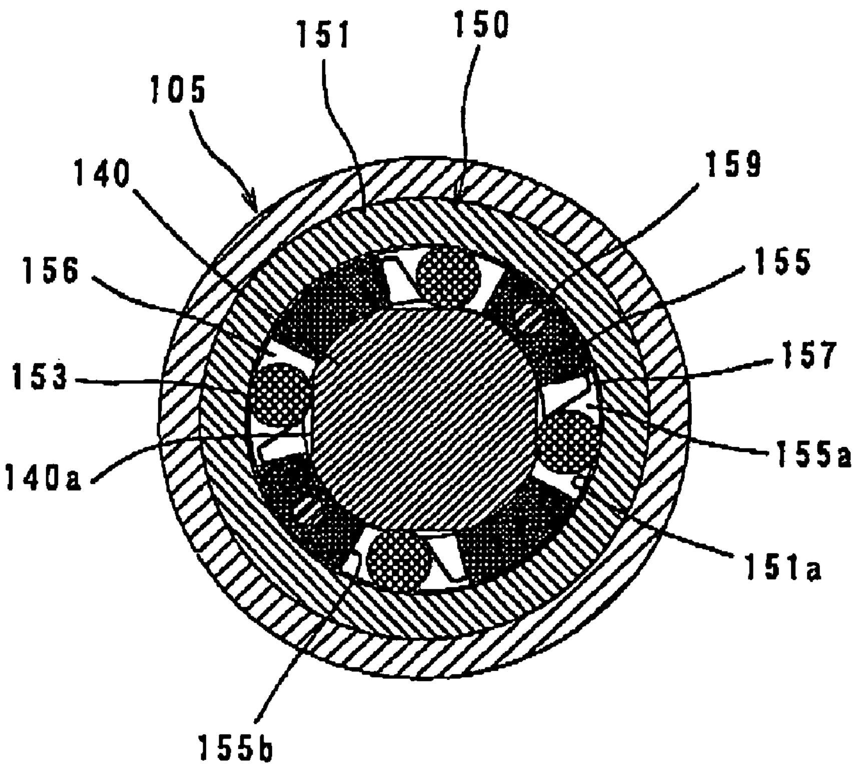
FIG. 6 is a sectional view taken along line A-A in FIG. 2.
Figure 7:
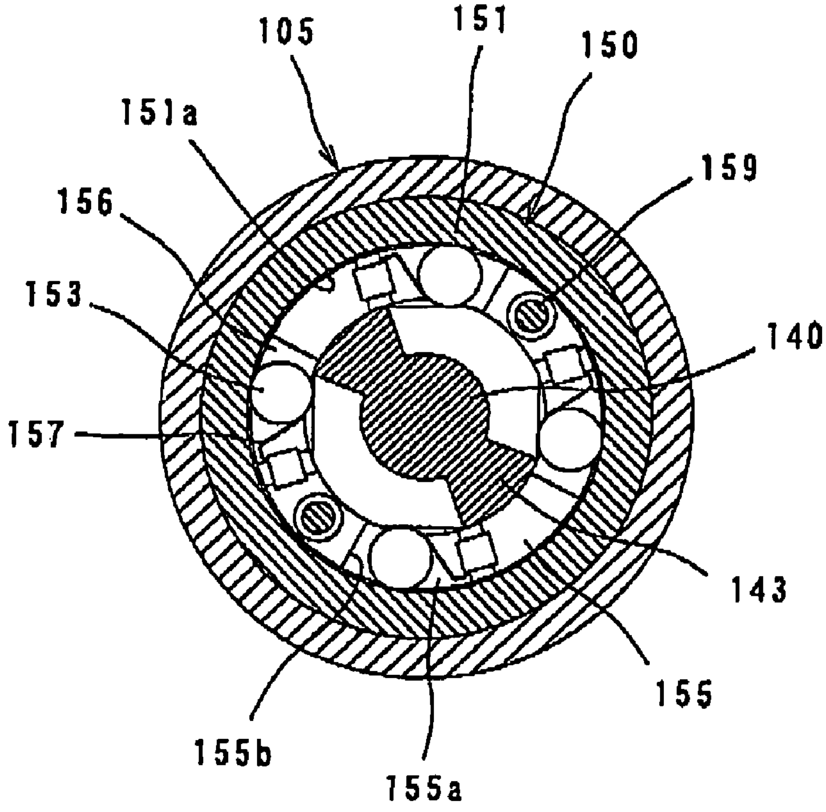
FIG. 7 is a sectional view taken along line B-B in FIG. 2.

As mainly shown in FIGS. 2, 6 and 7, one-way clutch 150 includes a fixed ring 151 fitted in the gear housing 105, a plurality of (four in this embodiment) needle pins 153 and a retainer 155 for holding the needle pins 153. The needle pins 153 are disposed between the fixed ring 151 and the second spindle 140 and serve to allow the second spindle 140 to rotate in the normal direction and prevent it from rotating in the reverse direction. The needle pins 153 correspond to the "rotation control member" and the "member having a circular section" according to this invention.

The fixed ring 151 has an annular inner peripheral surface 151*a* having an inside diameter slightly larger than the outside diameter of the retainer 155. Four planar regions 140*a* having a predetermined width are formed in the outer peripheral surface of the second spindle 140 and arranged equidistantly (at intervals of 90 degrees) in the circumferential direction. The needle pins 153 are disposed between the planar regions 140*a* and the inner peripheral surface 151*a* of the fixed ring 151. The planar regions 140*a* correspond to the "plane region" according to this invention. The needle pins 153 are disposed such that its axial direction coincides with the axial direction of the second spindle 140.

Space 156 is formed between the planar region 140*a* of the second spindle 140 and the inner peripheral surface 151*a* of the fixed ring 151. The radial width of the space 156 is at the maximum in the middle of the planar region 140*a* in the circumferential direction and at the minimum at the ends of the planar region 140*a*. Each of the needle pins 153 has the outside diameter smaller than the maximum width of the space 156 and larger than the minimum width of the space 156. The needle pin 153 is thus allowed to move between the minimum width position and the maximum width position in the space 156. In the state in which the needle pin 153 is in the minimum width position, when the second spindle 140 rotates in the normal direction (tightening direction), the needle pin 153 is pushed backed toward the maximum width position and allows the second spindle 140 to rotate in the tightening direction.

On the other hand, when the second spindle 140 rotates in the reverse direction (loosening direction), the needle pin 153 engages in the planar region 140*a* and the inner peripheral surface 151*a*, so that the second spindle 140 and the fixed ring 151 are locked together. Thus, the second spindle 140 is prevented from rotating. In the state in which the needle pin 153 is in the maximum width position, the needle pin 153 is disengaged from the planar region 140*a* and the inner peripheral surface 151*a*, so that the second spindle 140 is allowed to rotate both in the tightening direction and the loosening direction. The minimum width position and the maximum width position respectively correspond to the "actuated position" and the "released position" according to the invention.

The retainer 155 is generally cylindrically shaped and disposed between the fixed ring 151 and the second spindle 140 and can rotate with respect to both the fixed ring 151 and the second spindle 140. An O-ring 158 is disposed between the inner peripheral surface of the retainer 155 and the outer peripheral surface of the second spindle 140. Thus, the retainer 155 is provided with frictional resistance to rotation with respect to the second spindle 140. Therefore, unless forcibly torqued, the retainer 155 is held on the second spindle 140. The O-ring 158 is a feature that corresponds to the "elastic member" according to this invention. Four recesses 155*a* for retaining the needle pins 153 are formed in the retainer 155 and arranged at intervals of 90 degrees in the circumferential direction. Each of the recesses 155*a* has a notch-like shape having a predetermined depth extending forward from the axial rear end of the retainer 155. Each of the needle pins 153 is allowed to move between the minimum width position and the maximum width position within the associated recess 155*a*. Further, the needle pin 153 is normally biased toward one end of the planar region 140*a* in the circumferential direction or toward the minimum width position by a flat spring 157 mounted on the retainer 155. When the driving motor 111 is not driven, the needle pin 153 is held in the minimum width position.

Further, the retainer 155 has two rotation following pins 159 protruding to the carrier 131 side in order to be caused to rotate following the second spindle 140 when the second spindle 140 rotates. The rotation following pins 159 are disposed in the retainer 155 at intervals of 180 degrees in the circumferential direction. Correspondingly, two notch-like recesses 135*b* (see FIG. 8) are formed in the cylindrical portion 135 of the carrier 131 at intervals of 180 degrees in the circumferential direction. Each of the recesses 135*b* has a predetermined length in the circumferential direction. The protruding portion of each of the rotation following pins 159 is disposed within the associated recess 135*b*. When the carrier 131 rotates, the rotation following pin 159 is pushed by the carrier 131 in the circumferential direction in contact with an engagement surface 135*c* for normal rotation or an engagement surface 135*d* for reverse rotation which extends in a direction crossing the circumferential direction of the recess 135*b*. Thus, the retainer 155 is caused to rotate following the carrier 131. The rotation following pin 159 and the normal and reverse rotation engagement surfaces 135*c*, 135*d* we features that respectively correspond to the "third torque receiving part" and the "third torque transmitting part" according to the invention.

A predetermined phase angle α2 is provided in the circumferential direction between the rotation following pin 159 in contact with one of the engagement surfaces 135*c*, 135*d* and the other of the engagement surfaces 135*c*, 135*d* in the recess 135*b* (see FIG. 8). Thus, the carrier 131 and the retainer 155 are connected to each other via a play region in which torque transmission is not effected in the circumferential direction. The phase angle α2 between the rotation following pin 159 and the engagement surface 135*c* or 135*d* is larger man the intervals (the phase angle of 60 degrees) between the cams 121*b* of the torque limiter 120 and smaller than the phase angle α1 between the driven-side claw 143 and the driving-side claw 135*a*.

Operation and usage of the electric screwdriver 100 according to this embodiment will now be explained. First an operation of tightening screws (not shown) will be explained with reference mainly to FIGS. 9 to 12. The driving motor 11 is driven in the normal direction of rotation (clockwise) with a screw pressed against the workpiece via the driver bit 119. Then, the second spindle 140 is rotationally driven in the normal direction via the speed reducing mechanism 113, the torque limiter 120, the first spindle 130 and the carrier 131. Thus, the screw-tightening operation is performed via the tool holder 141 that rotates together with the second spindle 140, and the driver bit 119.

Figure 9:
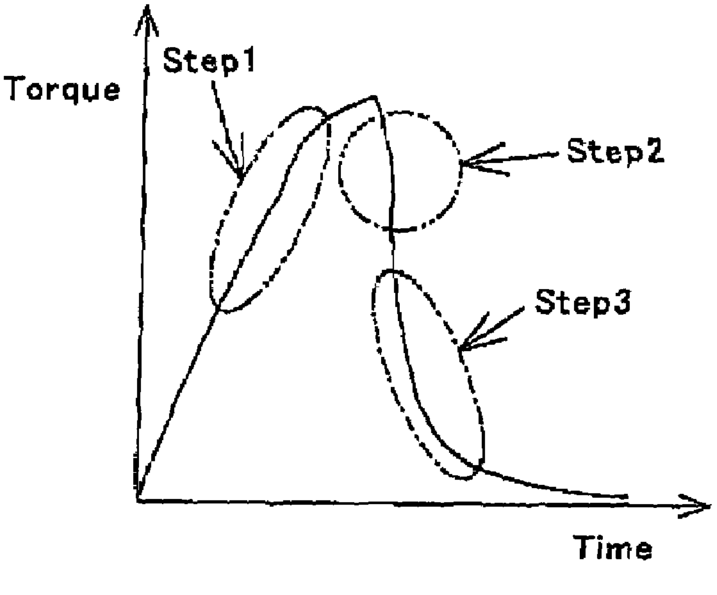
FIG. 9 is a graph showing the relationship between the torque and time during tightening operation (normal rotation).
Figure 11:
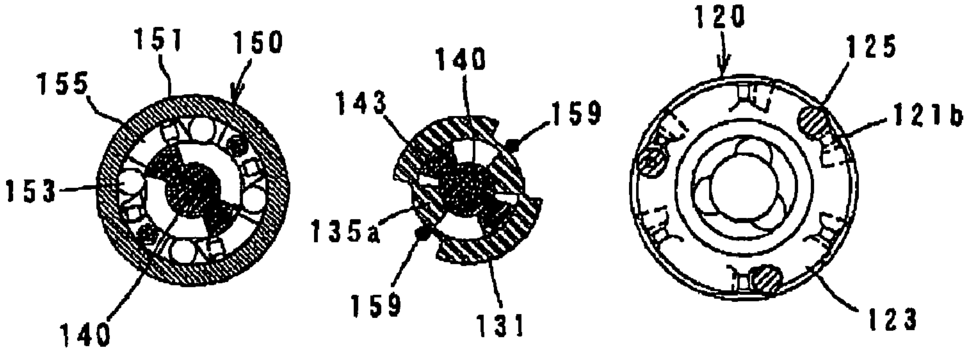
FIG. 11 is a view illustrating the operations of the torque limiter, the first and second spindles and the one-way clutch during tightening operation (normal rotation).
Figure 12:
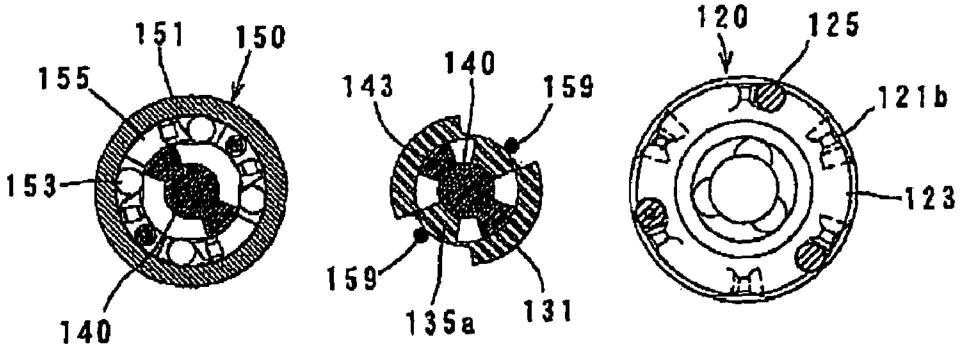
FIG. 12 is a view illustrating the operations of the torque limiter, the first and second spindles and the one-way clutch during tightening operation (normal rotation).

FIG. 9 is a graph showing the relationship between the torque and time during tightening operation (normal rotation). In the graph, step 1 represents a step just before actuation of the torque limiter 120 (just before interruption of torque transmission), step 2 is a step just after actuation of the torque limiter 120 (just after interruption of torque transmission), and step 3 is a step following step 2 after a lapse of a short period of time. Further, FIGS. 10 to 12 show the states in steps 1 to 3, respectively, with the torque limiter 120 shown at right, the carrier 131 and the second spindle 140 in the middle, and the one-way clutch 150 at left.

Figure 10:
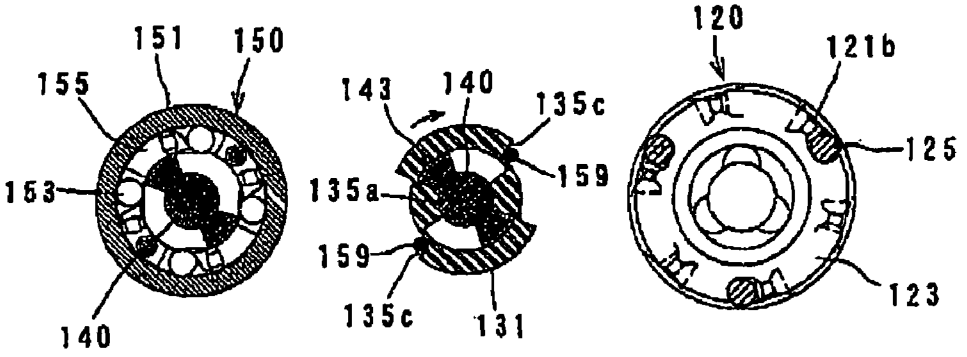
FIG. 10 is a view illustrating the operations of the torque limiter, the first and second spindles and the one-way clutch during tightening operation (normal rotation).

In step 1 as shown in FIG. 10, the driven-side clutch member 123 is placed in engagement with the cams 121*b* of the driving-side clutch member 121 via the first steel balls 125, so that the torque transmission of the torque limiter 120 is maintained. In this torque transmission state, the normal rotation engagement surfaces 135*c* of the carrier 131 that rotates together with the first spindle 130 are in contact with the rotation following pins 159 of the retainer 155. Therefore, the retainer 155 rotates in the tightening direction (clockwise). Further, the driving-side claws 135*a* of the carrier 131 are in contact with the driven-side claws 143 of the second spindle 140. Therefore, the second spindle 140 rotates in the tightening direction (clockwise) together with the carrier 131. In this state, in the one-way clutch 150, the needle pins 153 held in the minimum width position are pushed back to the maximum width position, so that the second spindle 140 is allowed to rotate. This state remains unchanged from the start to the final stage of the screw-tightening operation in which the seating surface of the screw head is seated on the workpiece.

When a screw is fastened to the workpiece with the seating surface of the screw head seated on the workpiece, the torque (rotational load) acting upon the first spindle 130 via the second spindle 140 and the carrier 131 exceeds a set value. Then, the torque limiter 120 is actuated, which brings about the state of step 2 and then the state of step 3. Specifically, as shown in FIG. 11, the first steel balls 125 climb over the cams 121*b* while moving the driven-side clutch member 123 away firm the driving-side clutch member 121 against the spring force of the compression coil spring 127. As a result, the torque transmission is interrupted. In the torque limiter 120, immediately after the torque transmission, a force acts upon the driven-side clutch member 123 in a direction that causes the driven-side clutch member 123 to rotate in the loosening direction (counterclockwise) (see the torque limiter 120 shown at right in FIGS. 11 and 12). As a result, the carrier 131 is caused to rotate in the loosening direction.

Therefore, in this embodiment, the phase angle α2 between the rotation following pin 159 of the retainer 155 and the engagement surface 135*c* that transmits the torque of the carrier 131 in contact with the rotation following pin 159 is larger than the intervals (of 60 degrees) between the cams 121*b*. With this construction, even if the carrier 131 is caused to rotate in the loosening direction when the torque limiter 120 is actuated to interrupt the torque transmission, the rotation of the carrier 131 is avoided from causing the retainer 155 to rotate (see the drawings shown in the middle of FIGS. 11 and 12). Specifically, the retainer 155 stops together with the second spindle 140 and holds the needle pins 153 in the minimum width position. In this state, when a force acts upon the fixed ring 151 in a direction that causes the fixed ring 151 to rotate in the tightening direction (clockwise), each of the needle pins 153 engages in the planar region 140*a* of the second spindle 140 and the inner peripheral surface 151*a* of the fixed ring 151, so that the second spindle 140 and the fixed ring 151 are locked together. Thus, the fixed ring 151 is prevented from rotating in the tightening direction by actuation of the one-way clutch 150.

When a tightening operation is performed by using the screwdriver 100, a reaction force acts upon the body 101 in a direction opposite to the tightening direction with respect to rotation on the axis of the driver bit 119. Therefore, the user holds the handgrip 107 in such a manner as to prevent the body 101 from being caused to rotate by the reaction force (i.e. the user applies a force in the tightening direction). In this state, when the torque limiter 120 is actuated and the reaction force on the body 101 is instantaneously eliminated, as its reaction, the user's hand holding the handgrip 107 may be caused to move in the tightening direction. At this time, according to this embodiment, as described above, the one-way clutch 150 prevents the body 101 (the fixed ring 151) from rotating in the tightening direction. Thus, the force applied by the user in the tightening direction can be supported by the second spindle 140 fixed on the workpiece side. Therefore, the user's hand holding the handgrip 107 can be prevented from moving in the tightening direction just after actuation of the torque limiter 120.

Figure 13:
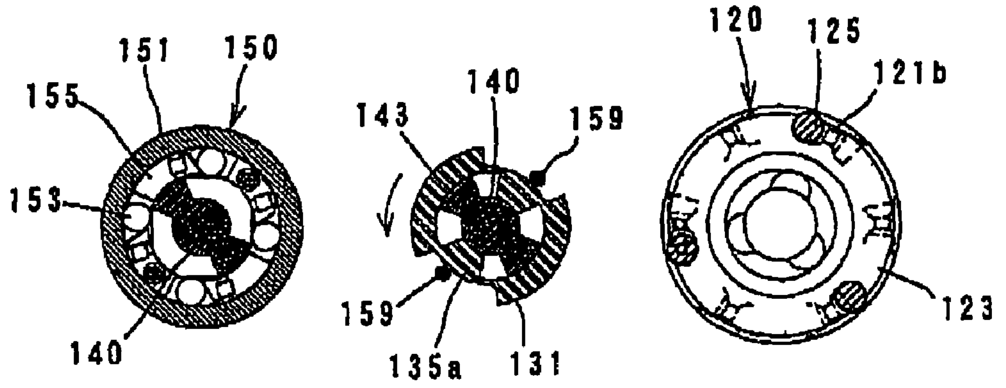
FIG. 13 is a view illustrating the operations of the torque limiter, the first and second spindles and the one-way clutch during loosening operation (reverse rotation).
Figure 14:
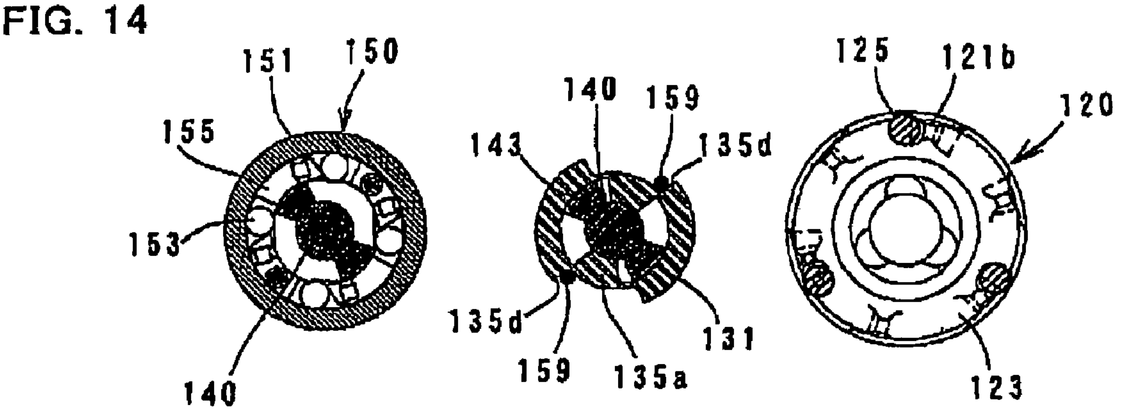
FIG. 14 is a view illustrating the operations of the torque limiter, the first and second spindles and the one-way clutch during loosening operation (reverse rotation).
Figure 15:
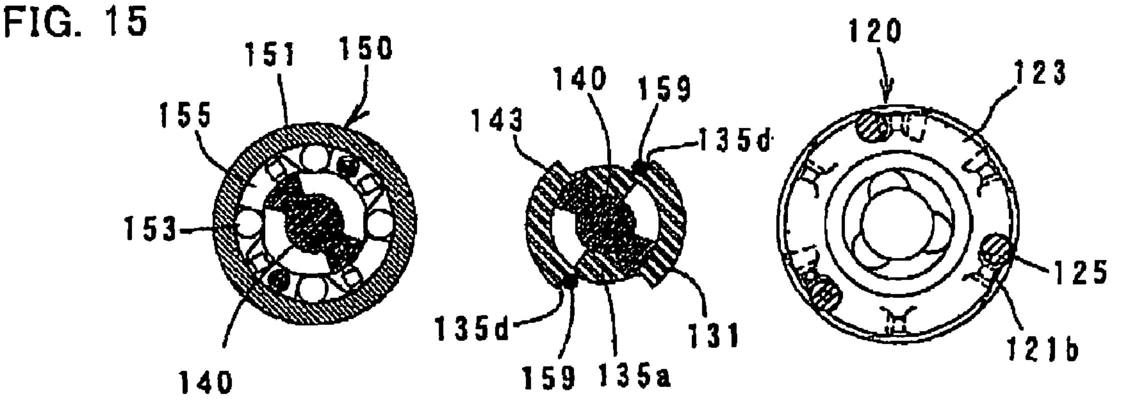
FIG. 15 is a view illustrating the operations of the torque limiter, the first and second spindles and the one-way clutch during loosening operation (reverse rotation).

Screw-loosening operation is explained with reference mainly to FIGS. 13 to 15. The driving motor 11 is driven in the reverse direction of rotation (counterclockwise) with the driver bit 119 pressed against a screw to be loosened. FIG. 13 shows the state just after the start of rotation in the reverse direction. In the torque limiter 120, the first steel balls 125 held by the driven-side clutch member 123 engage with the cams 121*b* of the driving-side clutch member 121, so that the carrier 131 is rotated together with the first spindle 130 in the reverse direction FIG. 14 shows an advanced state of the revere rotation. When the carrier 131 is rotated, the reverse rotation engagement surface 135*d* of the carrier 131 contacts the rotation following pin 159 of the retainer 155. Thereafter, the driving-side claw 135*a* of the carrier 131 contacts the driven-side claw 143 of the second spindle 140. Specifically, with the construction in which the phase angle (engagement angle) α2 for contact (engagement) between the engagement surface 135*d* and the rotation following pin 159 in the direction of rotation is smaller than the phase angle (engagement angle) α1 for contact (engagement) between the driving-side claw 135*a* and the driven-side claw 143 in the direction of rotation, contact between the engagement surface 135*d* and the rotation following pin 159 precedes contact between the driving-side claw 135*a* and the driven-side claw 143.

When the retainer 155 is caused to rotate in the reverse direction by contact between the engagement surface 135*d* and the rotation following pin 159, the needle pin 153 in the recess 155*a* of the retainer 155 is pushed by the wall surface 155*b* of the recess 155*a* and moved from the minimum width position to the maximum width position of the space 156 formed between the planar region 140*a* of the second spindle 140 and the inner peripheral surface 151*a* of the fixed ring 151. As shown at left in FIG. 15, when the needle pin 153 is moved to the maximum width position of the space 156, the needle pin 153 is disengaged from the fixed ring 151 and the second spindle 140. As a result, the function of the one-way clutch 150 is disabled and the second spindle 140 is allowed to rotate. Thereafter, the driving-side claw 135*a* of the carrier 131 contacts the driven-side claw 143 of the second spindle 140, so that the torque of the carrier 131 is transmitted to the second spindle 140. Thus, the screw-loosening operation is smoothly performed.

As described above, during the screw-tightening operation, the one-way clutch 150 disposed between the second spindle 140 and the gear housing 105 can eliminate the problem of reaction which may be caused when the torque limiter 120 is actuated. Further, during the loosening operation, the engaging function of the one-way clutch 150 can be automatically disabled, so that the loosening operation is smoothly performed. Particularly, in this embodiment, when the driving motor 111 is driven in the reverse direction of rotation, the engaging function of the one-way clutch 150 can be automatically disabled by utilizing rotation of the carrier 131 driven in the reverse direction. Therefore, the need to perform an additional operation for disabling the engaging function of the one-way clutch 150 can be eliminated, so that case of operation in switching between tightening operation mode and loosening operation mode can be enhanced.

Further, according to this embodiment, in the tightening operation in which the second spindle 140 is rotationally driven in the tightening direction, the second spindle 140 and the fixed ring 151 can be reliably locked by the wedging effect of the needle pin 153 that engages in (a narrow-angle portion) between the planar region 140*a* of the second spindle 140 and the inner peripheral surface 151*a* of the fixed ring 151 when the torque limiter 120 is actuated. Further, the needle pin 153 is biased toward the minimum width position by the flat spring 157, so that the needle pin 153 can be instantaneously and reliably engaged between the planar region 140*a* and the inner peripheral surface 151*a*.

Further, in this embodiment, with the construction in which the retainer 155 is held on the second spindle 140 via the O-ring 158 by friction, the retainer 155 can be prevented from finely moving, unless forcibly rotated by the carrier 131 rotating in the loosening direction. Thus, the proper functioning of the one-way clutch 150 can be ensured.

Further, in this embodiment, the electric screwdriver 100 having the torque limiter 120 is described as an example of the rotary fastening tool of the present invention. However, this invention can also be applied to any other rotary fastening tool having the torque limiter 120.

DESCRIPTION OF NUMERALS

100 electric screwdriver
101 body
103 motor housing
105 gear housing
107 handgrip
107*a* trigger
111 driving motor
113 speed reducing mechanism
115 rotation drive disc
119 driver bit
120 torque limiter
121 driving-side clutch member
121*a* annular groove
121*b* cam
123 driven-side clutch member
123*a* elongated groove
123*b* recess
125 firm steel ball
127 compression coil spring
128 second steel ball
129 spring receiving member
129*a* nut
130 first spindle
130*a* elongated groove
130*b* square hole
131 carrier
133 square shank
135 cylindrical portion
135*a* driving-side claw
135*b* recess
135*c*, 135*d* engagement surface
140 second spindle
140*a* planar region
141 tool holder
143 driven-side claw
150 one-way clutch
151 fixed ring
151*a* inner peripheral surface
153 needle pin
155 retainer
155*a* recess
155*b* wall surface
156 space
157 flat spring
158 O-ring
159 rotation following pin

I claim:

1. A rotary fastening tool comprising:
a tool body,
a motor housed within the tool body,
a driving-side rotating member that is rotationally driven by the motor,
a driven-side rotating member that is disposed coaxially with the driving-side rotating member,
a tip-end side rotating member that is disposed coaxially with the driven-side rotating member and rotationally driven via the driven-side rotating member, the tip-end side rotating member driving a tool bit to perform a tightening operation and
a rotation control mechanism that allows the tip-end side rotating member to rotate in the tightening direction during the tightening operation of the tool bit, wherein, when the tip-end side rotating member is fixed to a workpiece with the tool bit during the tightening operation and when torque transmission from the driving-side rotating member to the driven-side rotating member is interrupted, the rotation control mechanism locks the tip-end side rotating member and the tool body together against rotation with respect to each other to prevent the tool body from rotating in the tightening direction,
wherein, during a loosening operation of the tool bit, the rotation control mechanism is disabled from locking the tip-end side rotating member and the tool body by utilizing a rotation of the driven-side rotating member in the loosening direction to allow the loosening operation of the tool bit.

2. The rotary fastening tool as defined in claim 1 further comprising a torque limiter that transmits torque of the driving-side rotating member to the driven-side rotating member when the torque acting upon the driven-side rotating member is lower than a predetermined set value, while interrupting the torque transmission when the torque acting upon the driven-side rotating member exceeds the set value.

3. The rotary fastening tool as defined in claim 1 wherein the motor is driven either in a normal direction to perform a tightening operation or a reverse direction of rotation to perform a loosening operation by mode-selecting operation.

4. The rotary fastening tool as defined in claim 1 further comprising a torque limiter that transmits torque of the driving-side rotating member to the driven-side rotating member when the torque acting upon the driven-side rotating member is lower than a predetermined set value, while interrupting the torque transmission when the torque acting upon the driven-side rotating member exceeds the set value,
wherein the motor is driven either in a normal direction to perform a tightening operation or a reverse direction of rotation to perform a loosening operation by mode-selecting operation.

5. The rotary fastening tool as defined in claim 4, wherein the rotation control mechanism comprises:
a rotation control member disposed between the tool body and the tip-end side rotating member, the rotation control member being provided with an actuated position and a released position wherein the rotation control member in the actuated position locks the tip-end side rotating member and the tool body when the tip-end side rotating member is rotated in the loosening direction during the tightening operation, while the rotation control member in the released position releases prohibits the locking between the tip-end side rotating member and the tool body.

6. The rotary fastening tool as defined in claim 5, wherein the rotation control mechanism comprises a retainer that is disposed between the tool body and the tip-end side rotating member such that the retainer is allowed to rotate with respect to the tool body and the tip-end side rotating member and wherein the retainer moves the rotation control member between the actuated position and the released position and retains the rotation control member in that position.

7. The rotary fastening tool as defined in claim 6, wherein, when the motor is driven in the normal direction and the driven-side rotating member is rotated in the tightening direction, the driven-side rotating member rotates the retainer in the tightening direction before rotationally driving the tip-end side rotating member and the retainer moves the rotation control member to the actuated position.

8. The rotary fastening tool as defined in claim 6, wherein, when the motor is driven in the reverse direction and the driven-side rotating member is rotated in the loosening direction, the driven-side rotating member rotates the retainer in the loosening direction before rotationally driving the tip-end side rotating member and the retainer moves the rotation control member to the released position.

9. The rotary fastening tool as defined in claim 5, wherein the retainer is held by friction by the elastic member in such a manner as to be prevented from rotating with respect to the tip-end side rotating member unless rotated by the driven-side rotating member rotating in the loosening direction.

10. The rotary fastening tool as defined in claim 4, wherein:

the tip-end side rotating member has a plane region in a predetermined extent in the circumferential direction, the rotation control member comprises a member having a circular section, wherein, during the tightening operation of the tool bit, when the torque limiter interrupts the torque transmission, the rotation control member moves toward one end of the plane region in the circumferential direction and engages with both the plane region and the inner wall surface of the tool body, thereby locking the tip-end side rotating member and the tool body together and controlling rotation of the tool body in the tightening direction with respect to the tip-end side rotating member, and the retainer has an elastic element that biases the circular member toward the one end of the plane region in the circumferential direction.

11. The rotary fastening tool as defined in claim 4, wherein:

the torque limiter includes a plurality of first torque receiving parts and a plurality of first torque transmitting parts in the circumferential direction, wherein the first torque receiving parts are provided on the driven-side rotating member and the first torque transmitting parts rotate together with the driving-side rotating member and transmit torque of the driving-side rotating member to the driven-side rotating member while being held in contact with the first torque receiving parts, and the rotary fastening tool further includes:

a second torque receiving part that protrudes radially outward from the tip-end side rotating member, a second torque transmitting part having a predetermined phase difference in the circumferential direction with respect to the second torque receiving part, wherein the second torque transmitting part rotates together with the driven-side rotating member and transmits torque of the driven-side rotating member to the tip-end side rotating member while being held in contact with the second torque receiving part, a third torque receiving part that protrudes from the retainer in the direction of a rotation axis of the driven-side rotating member, and a third torque transmitting part having a predetermined phase difference in the circumferential direction with respect to the third torque receiving part, wherein the third torque transmitting part rotates together with the driven-side rotating member and transmits torque of the driven-side rotating member to the retainer while being held in contact with the third torque receiving part, wherein a phase angle between the third torque receiving part and the third torque transmitting part in the circumferential direction is larger than a phase angle between the first torque transmitting parts in the circumferential direction and a phase angle between the third torque receiving part and the third torque transmitting part in the circumferential direction is smaller than a phase angle between the second torque receiving part and the second torque transmitting part in the circumferential direction.

12. The rotary fastening tool as defined in claim 1, wherein the rotary fastening tool is provided as an electric screw driver to drive a driver bit for tightening and/or loosening a screw.

13. A rotary fastening tool comprising:

a tool body, a motor housed within the tool body, a driving-side rotating member that is rotationally driven by the motor, driven-side member driving a tool bit and a rotation control mechanism that allows the tip-end side rotating member to rotate in the tightening direction during the tightening operation of the tool bit, wherein, when torque transmission from the driving-side rotating member to the driven-side member is interrupted, the rotation control mechanism locks the driven-side member and the tool body together against rotation with respect to each other, wherein, during a loosening operation of the tool bit, the rotation control mechanism is disabled from locking the tip-end side rotating member and the tool body by utilizing a rotation of the driven-side rotating member in the loosening direction to allow the loosening operation of the tool bit.

14. A rotary fastening tool comprising:

a tool body, a motor that is housed within the tool body and is driven either in a normal direction or a reverse direction of rotation by mode-selecting operation, a driving-side rotating member that is rotationally driven by the motor, a driven-side rotating member that is disposed coaxially with the driving-side rotating member, a torque limiter that transmits torque of the driving-side rotating member to the driven-side rotating member when the torque acting upon the driven-side rotating member is lower than a predetermined set value, while interrupting the torque transmission when the torque acting upon the driven-side rotating member exceeds the set value, a tip-end side rotating member that is disposed coaxially with the driven-side rotating member and rotationally driven via the driven-side rotating member, a tool bit that performs a tightening operation when rotationally driven in the normal direction via the tip-end side rotating member and performs a loosening operation when rotationally driven in the reverse direction, and a rotation control mechanism that allows the tip-end side rotating member to rotate in the tightening direction during the tightening operation of the tool bit, wherein, when the tip-end side rotating member is fixed to a workpiece with the tool bit during the tightening operation and when torque transmission from the driving-side rotating member to the driven-side rotating member is interrupted, the rotation control mechanism locks the tip-end side rotating member and the tool body together against rotation with respect to each other to prevent the tool body from rotating in the tightening direction and wherein, during the loosening operation of the tool bit, the rotation control mechanism is disabled from locking the tip-end side rotating member and the tool body by utilizing a rotation of the driven-side rotating member in the loosening direction to allow the loosening operation of the tool bit.

* * * * *